US011061700B2

(12) United States Patent
Jernigan et al.

(10) Patent No.: US 11,061,700 B2
(45) Date of Patent: Jul. 13, 2021

(54) VIRTUAL ASSISTANTS USING STATE-BASED ARTIFICIAL INTELLIGENCE

(71) Applicant: Cleverspeck, LLC, Herndon, VA (US)

(72) Inventors: Donald Jernigan, Ashburn, VA (US); Ryan Edgerley, Herndon, VA (US); Bekir Atahan, Ashburn, VA (US); Ayshe Tanyel, Fairfax, VA (US)

(73) Assignee: CLEVERSPECK, LLC, Herndon, VA (US)

( * ) Notice: Subject to any disclaimer, the term of this patent is extended or adjusted under 35 U.S.C. 154(b) by 1031 days.

(21) Appl. No.: 15/628,121

(22) Filed: Jun. 20, 2017

(65) Prior Publication Data

US 2018/0365026 A1 Dec. 20, 2018

(51) Int. Cl.
*G06N 20/00* (2019.01)
*G06N 3/00* (2006.01)
*G06F 9/451* (2018.01)
*H04L 12/58* (2006.01)

(52) U.S. Cl.
CPC .............. *G06F 9/453* (2018.02); *G06N 20/00* (2019.01); *H04L 51/02* (2013.01); *H04L 51/043* (2013.01); *G06N 3/006* (2013.01)

(58) Field of Classification Search
CPC ............ G06N 5/04; G06N 20/00; G06N 5/02; G06N 5/003; G06Q 30/02
USPC ........................................................ 706/46
See application file for complete search history.

(56) References Cited

U.S. PATENT DOCUMENTS

| 8,688,667 | B1* | 4/2014 | Kurzion | G06F 16/9535 |
| | | | | 707/705 |
| 2010/0057723 | A1 | 3/2010 | Rajaram | |
| 2011/0196863 | A1 | 8/2011 | Marcucci et al. | |
| 2014/0040748 | A1* | 2/2014 | Lemay | G10L 15/1822 |
| | | | | 715/728 |
| 2015/0348549 | A1* | 12/2015 | Giuli | G06F 3/167 |
| | | | | 704/235 |
| 2017/0097966 | A1* | 4/2017 | Kozareva | G06Q 30/02 |
| 2017/0160813 | A1* | 6/2017 | Divakaran | G10L 15/1815 |
| 2017/0161018 | A1* | 6/2017 | Lemay | G06F 16/9562 |
| 2018/0174055 | A1* | 6/2018 | Tirumale | G06Q 10/10 |

OTHER PUBLICATIONS

T. Mamedov (Authorized Officer), International Search Report and Written Opinion dated Sep. 27, 2018, PCT Application No. PCT/US2018/035601, filed Jun. 1, 2018, pp. 1-7.

* cited by examiner

*Primary Examiner* — Viker A Lamardo
(74) *Attorney, Agent, or Firm* — MH2 Technology Law Group LLP

(57) ABSTRACT

Embodiments relate to systems, devices, and computing-implemented methods for providing a response system for a chatbot program and/or virtual assistant that can perform operations including receiving user input that includes an identifier, determining a current state based on the identifier, determining an intent engine stack based on the current state, processing the user input using an intent engine in the intent engine stack to obtain an intent and a variable, performing an action based on the current state, the intent, and the variable, and transitioning to a next state based on the action, the current state, the intent, and the variable.

20 Claims, 8 Drawing Sheets

US 11,061,700 B2

VIRTUAL ASSISTANTS USING STATE-BASED ARTIFICIAL INTELLIGENCE

BACKGROUND

A long-standing challenge for computer technologies and, in particular, artificial intelligence technologies has been to develop a "chatbot" program that can convincingly participate in a real-time conversation with a user by parsing user input in the form of text, audio, and/or visual input and generating a user-interpretable response to the input in the form of text, audio, and/or visual output.

Early chatbot programs relied on recognizing cue words or phrases in the input and outputting pre-prepared or pre-programmed responses based on the recognized cue words or phrases to create an illusion of human intelligence.

More recently, virtual assistants have emerged as an improved form of chatbot programs. Virtual assistants can accept text, voice, and/or image input from a user and are capable of not only responding in real-time to the user input (e.g., outputting text, simulated voice, and/or images), but can also perform tasks or services in response to the user input.

Similar to chatbot programs, virtual assistants recognize cue words or phrases in the input. Then, the virtual assistants determine an intent of the user based on what is recognized, perform an action based on the determined intent, respond to the user based on the determined intent and/or the performed action, and start the process over.

Generally, the longer a conversation with a chatbot program (including virtual assistants) the more the illusion of human intelligence breaks down because the chatbot program is not capable of storing and accessing an extensive record of the conversion and, thus, will eventually be unable to respond to new input in the context of a previous conversation. This can lead to errors and inefficiencies in processing input from the user, determining the intent of the user, performing actions, and responding to the user.

Therefore, systems, methods, and computer-readable media are desirable that can improve the contextual understanding of chatbots (including virtual assistants).

SUMMARY

The present disclosure relates to systems, devices, and methods for providing a response system for a chatbot program and/or virtual assistant that can perform operations including receiving user input that includes an identifier, determining a current state based on the identifier, determining an intent engine stack based on the current state, processing the user input using an intent engine in the intent engine stack to obtain an intent and a variable, performing an action based on the current state, the intent, and the variable, and transitioning to a next state based on the action, the current state, the intent, and the variable.

In some embodiments, the user input can include recorded audio from a smart speaker or textual data from a chat window in a browser application.

In other embodiments, the user input can include parsed user input received from a virtual assistant application programming interface (API).

In further embodiments, the operations can include converting the user input into a common format.

In some implementations, processing the user input using the intent engine in the intent engine stack can include processing the user input using a plurality of intent engines in the intent engine stack, and the intent engine can be associated with a confidence score that is greater than confidence scores for other intent engines in the intent engine stack.

In other implementations, the operations can include determining that a required variable associated with the current state is invalid, and transmitting a response to the user input that includes a request for the required variable.

In further implementations, performing the action can include transmitting instructions to a smart device to perform a function.

In some embodiments, performing the action can include transmitting instructions to a service system to perform the action.

In other embodiments, performing the action can include transmitting a response to a user device that transmitted the user input, where the user device outputs the response as at least one of text or audio.

In further embodiments, performing the action can include performing the action using one or more of a state variable that is cleared based on transitioning to the next state, a session variable that is cleared at the end of a conversation associated with the current state, or a long term variable.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1:
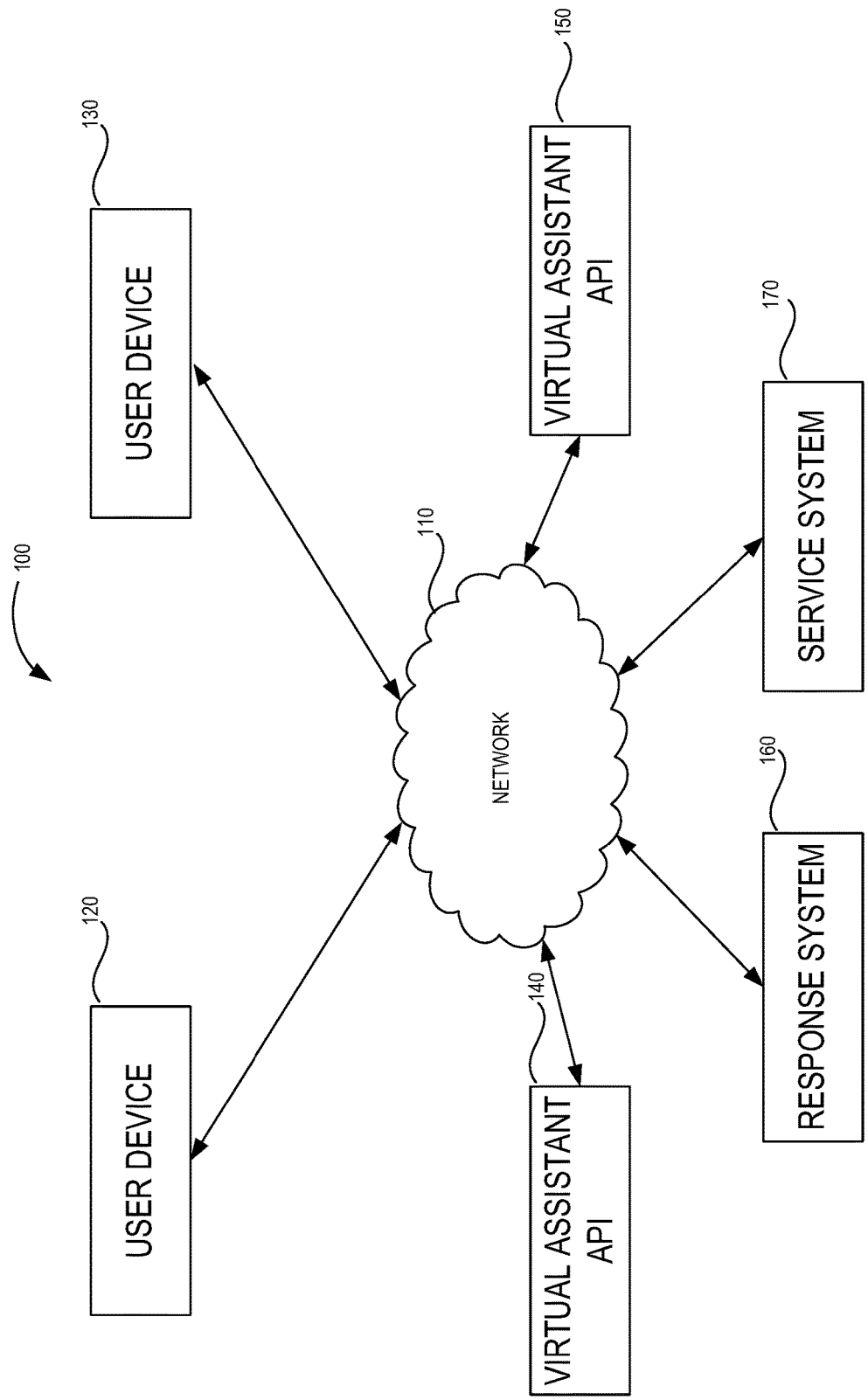
FIG. 1 is a diagram illustrating an example of a virtual assistant system for performing actions and responding to user input, consistent with certain disclosed embodiments.

The following detailed description refers to the accompanying drawings. Wherever convenient, the same reference numbers are used in the drawings and the following description to refer to the same or similar parts. While several examples of embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

The principals disclosed herein may refer to "chatbot programs" and/or "virtual assistants." However, these terms are intended to be used interchangeably, and principles described with regard to chatbot programs can also be applied to virtual assistants, and vice versa, consistent with disclosed embodiments.

In general, virtual assistants can be improved using a state engine that allows the virtual assistant to indefinitely maintain an awareness of the context of a conversation with a user, without an extensive record of user conversations. In some disclosed embodiments, virtual assistants can receive user input, determine the user's intent based on the user input and the current state of the conversation, perform an action based on the user's intent and the current state of the conversation, respond to the user based on the user input and current state of the conversation, and transfer to a new state that corresponds to an updated state of the conversation.

Therefore, virtual assistants that utilize such a state-based artificial intelligence can increase the accuracy of the virtual assistant in determining user-intent, as well as further the illusion that the user is talking to a real person. Additionally, a state-based artificial intelligence can improve accuracy of responses of the virtual assistant.

In previous systems, users of virtual assistants wasted time, as well as processing and networking resources by submitting user input that was correct in the context of the conversation but was incorrectly interpreted by previous virtual assistants that could not maintain the context of the conversation. Generally, this would result in the user being forced repeat, rephrase, or otherwise rearrange the input to express the desired intent, resulting in the usage of more time, processing resources of the client's device, processing resources of backend systems of the virtual assistant, and networking resources for the extra communications. Additionally, the embodiments disclosed herein can efficiently utilize computer storage by maintaining states that can apply to many users, as opposed to maintaining extensive records of conversations of every user.

As disclosed herein, embodiments of the present disclosure can be implemented in a service associated with a virtual assistant system. In various embodiments, as discussed in further detail below, the service could allow users to access the service via different virtual assistant application programming interfaces (APIs), such as Alexa® from Amazon.com Inc.®, Bixby® from Samsung Group®, Cortana® from Microsoft®, Google Assistant® from Google Inc.®, M® from Facebook, Inc.®, and Siri® from Apple Inc.®.

FIG. 1 is a diagram illustrating an example of a virtual assistant system 100 for performing actions and responding to user input, consistent with certain disclosed embodiments. The virtual assistant system 100 can include a network 110, a user device 120, a user device 130, a virtual assistant API 140, a virtual assistant API 150, a response system 160, and a service system 170.

In some implementations, the network 110 can represent one or more communication networks. For example, the network 110 can represent one or more wide area networks (e.g., the Internet), one or more local area networks, one or more telecommunications networks, and the like.

In some embodiments, the user device 120 and the user device 130 can each represent one or more computing devices. For example, the user device 120 and the user device 130 can each represent one or more personal computing devices (e.g., laptops, desktops, tablet computers, etc.), smart devices (e.g., smart speakers, smartphones, smart appliances, home automation devices, smart televisions, Internet of Things (IoT) devices, etc.), webservers, databases, mainframe devices, or other computing devices. In additional embodiments, the user device 120 and the user device 130 can be computing devices of end users that are attempting to utilize the virtual assistant system 100 via the computing devices. For example, an end user may submit text, voice, and/or image input to the virtual assistant system 100 via the user device 120 or the user device 130.

For the sake of providing a simplified example, FIG. 1 depicts two user devices. However, in various embodiments, more than two user devices of more than two users can be part of the virtual assistant system 100. For example, hundreds or thousands of user devices of varying types (e.g. personal computing devices, smart devices, etc.) can be part of the virtual assistant system 100, can submit input to virtual assistant APIs and/or the response system 160 in the virtual assistant system 100, and can receive responses from the response system 160.

In further embodiments, the virtual assistant API 140 and the virtual assistant API 150 can each represent one or more computing devices. For example, the virtual assistant API 140 and the virtual assistant API 150 can each represent one or more webservers, databases, mainframe devices, or other computing devices. In additional embodiments, the virtual assistant API 140 and the virtual assistant API 150 can each be a computing devices associated with a specific intent engine (described in further detail below), and can be capable of receiving user input (e.g., from the user device 120 or the user device 130), translating the received user input (e.g., converting voice to text, correcting grammatical errors, etc.), and providing parsed user input to, for example, the response system 160.

In some implementations, a user device can correspond to a particular virtual assistant API. For example, the user device can be a smart speaker that can capture voice input from the user as recorded audio, and the user device can be configured to send the recorded audio to a particular virtual assistant API. In other implementations, a user device may not specifically correspond to a particular virtual assistant API, but can send text, recorded audio, captured visual input, etc. to the virtual assistant API and/or a response system.

For the sake of providing a simplified example, FIG. 1 depicts two virtual assistant APIs 140, 150. However, in various embodiments, more than two virtual assistant APIs can be part of the virtual assistant system 100. For example, three or more virtual assistant APIs can be part of the virtual assistant system 100, can receive input to and from multiple user devices, can parse the input, can transmit the parsed input to the response system 160 in the virtual assistant system 100, can receive responses from the response system 160, and can translate the received responses from the response system 160 to output for end users (e.g., text, audio, and/or visual output).

In some embodiments, the response system 160 can represent one or more computing devices. For example, the response system 160 can represent one or more webservers, databases, mainframe devices, or other computing devices. In additional embodiments, response system 160 can be a computing device that can receive input from user devices (e.g., the user device 120 or the user device 130), receive parsed input from virtual assistant APIs (e.g., the virtual assistant API 140 or the virtual assistant API 150), process the parsed input based on a current state, perform actions (e.g., at the response system 160 or by requesting actions be performed by a service system (e.g., the service system 170)), provide responses to virtual assistant APIs, provide responses to user devices, etc.

In further embodiments, the service system 170 can represent one or more computing devices. For example, the service system 170 can represent one or more webservers, databases, mainframe devices, or other computing devices. In additional embodiments, service system 170 can be a computing device that can receive requests to perform actions from the response system 160 and perform the requested actions. For example, the service system 170 can be associated with a food delivery service, and the requested action can be to institute a food delivery order for an end user of a user device (e.g., the user device 120 or the user device 130). As a further example, the service system 170 can be associated with an Internet of Things (IoT) service, and the requested action can be to turn on or off an appliance, configure a setting of an appliance, toggle a light switch, lock or unlock a door, etc. As an additional example, the service system 170 can be associated with a customer support service, and the requested action can be to provide a response to a customer support question.

The virtual assistant system 100 described above is merely a simplified example of such a system. In various embodiments, the virtual assistant system 100 can include additional networks, user devices, virtual assistant APIs, response systems, service systems, etc. Additionally, the virtual assistant system 100 can include other computer network entities, such as, for example, domain name servers, internet service providers, website servers, etc.

Figure 2:
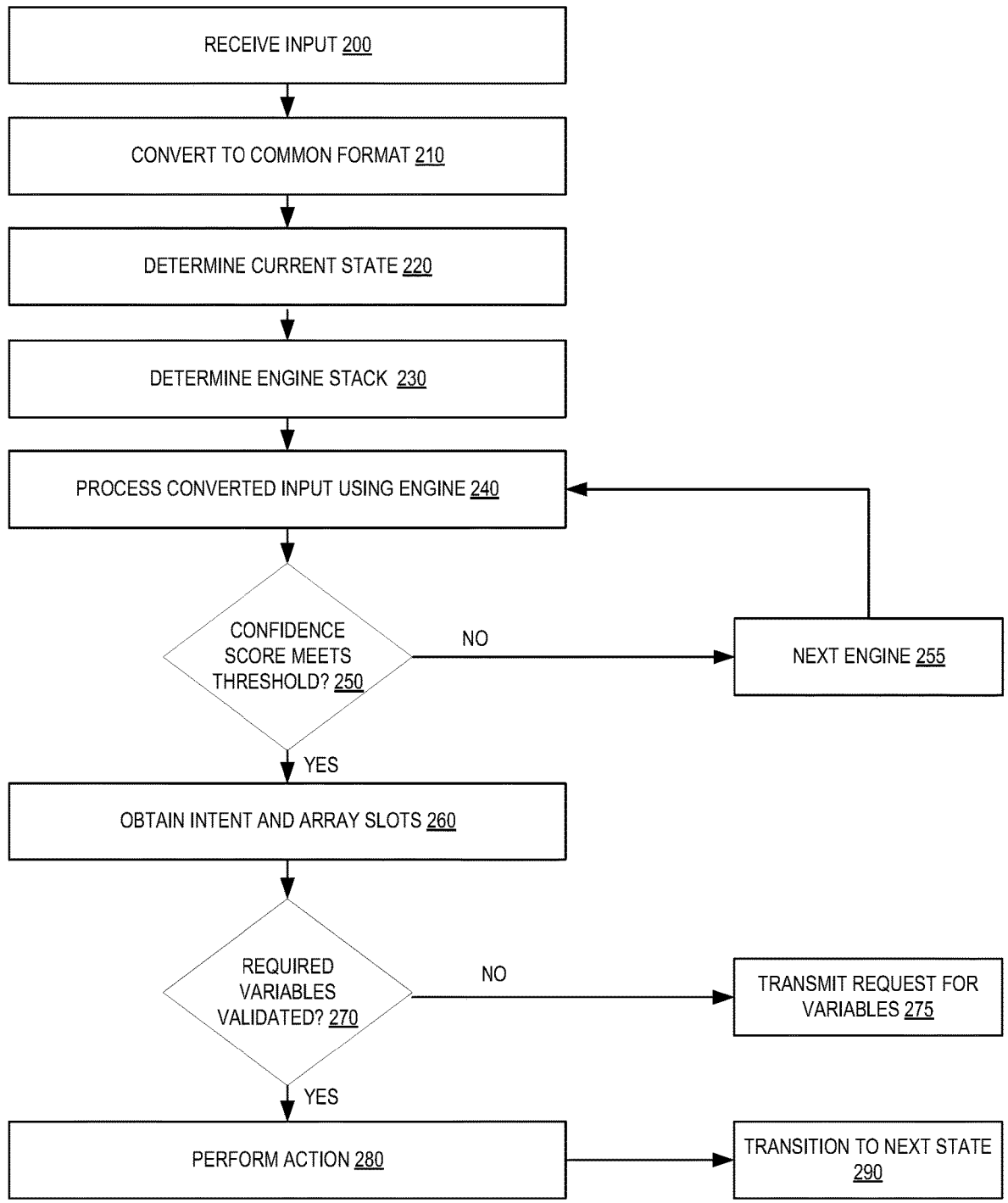
FIG. 2 is a flow diagram illustrating an example of a process for performing actions and responding to user input using state-based artificial intelligence, consistent with certain disclosed embodiments.

FIG. 2 is a flow diagram illustrating an example of a process for performing actions and responding to user input using state-based artificial intelligence, consistent with certain disclosed embodiments. In some embodiments, the method described in FIG. 2 can be performed using a computing device such as, for example, a webserver, a mainframe device, a personal computing device, etc.

In some implementations, the computing device can be, for example, a response system, such as, for example, the response system 160, described above with regard to FIG. 1.

The process can begin in 200, when the computing device receives input from a user device (e.g., the user device 120 or the user device 130, described above with regard to FIG. 1).

In some embodiments, the input can be parsed input received from a virtual assistant API (e.g., the virtual assistant API 140 or the virtual assistant API 150, described above with regard to FIG. 1). For example, a virtual assistant API may receive text, audio, image, video, or any other type of input from a user, and the virtual assistant API can parse the input by, for example, converting voice to text, performing natural language processing algorithms, performing optical character recognition, and/or performing an initial interpretation of the input (e.g., correcting grammar, arranging cue words or phrases, etc.). Then, the virtual assistant API can generate a parsed input communication that includes converted, recognized, and/or partially interpreted input as textual data.

In some implementations, the virtual assistant API may additionally identify the user device that transmitted the input, a user of the user device, and/or a session associated with the user device and/or user. Accordingly, the virtual assistant API can identify one or more of a user identifier (ID), a user device ID, or a session ID. In such implementations, the virtual assistant API can include the user ID, the user device ID, and/or the session ID with the textual data in the parsed user input communication, and the parsed input communication can be transmitted to the computing device.

In further implementations, the virtual assistant API may validate a user and/or a user device based on, for example, the user ID or the user device ID. In some embodiments, if the user and/or the user device cannot be validated, then the virtual assistant API may not send parsed input to the computing device and may, for example, discard the input and/or transmit a correspondence to the user device indicating the failure to validate.

In other implementations, the computing device may validate a user, a user device, and/or a virtual assistant API that sent the user input based on, for example, a user ID, a user device ID, a virtual assistant API ID, etc. In some embodiments, if the user, the user device, and/or the virtual assistant API that sent the user input cannot be validated, then the computing device may not further process the user input and may, for example, discard the input and/or transmit a correspondence to the user device or the virtual assistant API indicating the failure to validate.

In other embodiments, the input can be parsed input received from the user device. For example, the user device may include logic and/or an application for parsing text, audio, or image input from a user, converting voice to text, performing natural language processing algorithms, performing optical character recognition, and/or performing an initial interpretation of the input (e.g., correcting grammar, arranging cue words or phrases, etc.). For example, the logic can be included in a browser application that the user uses to enter the user input. Using, for example, the browser application, the user device can generate a parsed input communication that includes converted, recognized, and/or partially interpreted input as textual data.

In some implementations, the user device may be associated with a user device ID and may additionally identify a user of the user device, and/or a session associated with the user device and/or user. Accordingly, the user device can identify one or more of a user ID or a session ID. In such implementations, the user device can include the user ID, the user device ID, and/or the session ID with the textual data in the parsed input communication, and the parsed input communication can be transmitted to the computing device.

In other implementations, the computing device may validate a user and/or a user device that sent the user input based on, for example, a user ID and/or a user device ID. In some embodiments, if the user and/or the user device that sent the user input cannot be validated, then the computing device may, for example, discard the input and/or transmit a correspondence to the user device indicating the failure to validate.

In further embodiments, the input can be raw input received from the user device. For example, the raw input may include text, audio, or image input from a user, and the computing device can convert voice to text, perform natural language processing algorithms, perform optical character recognition, and/or perform an initial interpretation of the input (e.g., correcting grammar, arranging cue words or phrases, etc.) to generate parsed input.

In 210, in some embodiments, the computing device can convert the received user input into a common format. For example, user input can be raw data or data that is in a proprietary or otherwise closed format of the virtual assistant API that parsed the user input or of the user device that sent the user input. Accordingly, the computing device can convert the user input into a common format that is readable by multiple intent engines.

As used herein, an intent engine is an application or a part thereof that processes user input (e.g., textual data in a common format) and determines and outputs a representation of a user's intent, processes variables associated with performing an action based on the user's intent, and/or determines a confidence score associated with a determined user's intent.

In 220, the computing device can determine a current state associated with a user ID, a user device ID, and/or a session ID included with the user input. The current state can represent a current state of a conversation between a user at the user device and the computing device. In some embodiments, the current state can be the last state that the computing device transitioned to based on a previous input from the user before the current user input received in 200. In other embodiments, the current state may have been set by another device, such as, for example, a service system (e.g., the service system 170) or a different user device (e.g., as shown in the example in FIG. 7, below). In further embodiments, the current state may have been transitioned to by the computing device based, for example, a session timing out, an action based on input associated with a different user ID, user device ID, session ID, etc.

In some embodiments, a user ID can be associated with a specific current state. Accordingly, even if the user device ID or the session ID is different from previous communications, the state associated with the user ID can be identified as the current state. In other embodiments, a user device ID can be associated with a specific current state. Accordingly, even if the user ID or the session ID is different from previous communications, the state associated with the user device ID can be identified as the current state. In further embodiments, a session ID can be can be associated with a specific current state. Accordingly, even if the user ID or the user device ID is different from previous communications, the state associated with the session ID can be identified as the current state. In still further embodiments, a combination of two or more of a user ID, a user device ID, or a session ID can be associated with a specific current state.

In some implementations, a state can be associated with various factors corresponding to the state of the conversation. For example, the state can be associated with the number of times that a user or a user device have asked a certain question, the number of times the user or the user device have been sent a specific response, what variables are stored in session memory or long term memory, etc. In further implementations, there may not be a record of what state(s) occurred before the current state. In other words, the computing device may not maintain extensive records of conversations of every user and/or user device or even a limited history of previous states. Instead, the computing device can maintain the current states associated with user IDs, user device IDS, and/or session IDs.

In 230, the computing device can determine an intent engine stack for determining an intent of the user input received in 200. In various embodiments, the engine stack can correspond to a specific order of intent engines, and the specific order can be set based on, for example, the current state, state variables of the current state, session variables associated with the session ID, long term memory associated with the user ID or the user device ID, and/or a previous action performed by the computing device or a service system.

For example, the computing device can determine that the user is a new user (e.g., based on the user ID) and/or that the current state is an initial state of the conversation. Accordingly, the computing device can determine an engine stack associated with a first communication in a conversation.

In a first iteration of 240, the computing device can, in some embodiments, select the first intent engine in the engine stack and process the input (e.g., that was converted to the common format in 210) using the engine to generate a representation of a user's intent, variables associated with performing an action based on the user's intent, and a confidence score.

In 250, the computing device can determine if the confidence score meets a threshold value. For example, the confidence score can be a percentage value (e.g., 10%, 40%, 70%, and the like) that represents a confidence that the generated representation of the user's intent corresponds to the user's actual intent. Accordingly, the threshold value can be a percentage, such as 60%, 70%, 90%, etc.

If, in 250, the confidence score does not meet the threshold value (e.g., is less than the threshold value) (250: NO), then the process can proceed to 255, and the computing device can select the next engine in the engine stack determined in 230.

Then, in 240, the computing device can process the converted input using the next engine in the engine stack to generate a representation of the user's intent, variables associated with performing an action based on the user's intent, and a confidence score, and determine, in 250, if the confidence score meets the threshold value.

If, in 250, the confidence score meets the threshold value (e.g., is greater than or equal to the threshold value) (250: YES), then the process can proceed to 260 with the output of the current engine. In some embodiments, if all engines in the engine stack have been run and no confidence score meets the threshold value, then the process can proceed to 260 with the output of the engine that, for example, achieved the highest confidence score.

In other embodiments, intent engines may not generate a confidence score or confidence scores of the intent engines may not be used. For example, in some implementations, the converted input can be processed using multiple intent engines to generate representations of a user's intent and variables. Then, the computing device can compare the representations generated by the different intent engines.

For example, if two intent engines determine that the user's intent is A and one intent engine determines that the user's intent is B, the computing device can use A as the representation of the user's intent.

In 260, the computing device can obtain the representation of the user's intent and variables associated with performing an action based on the user's intent that were generated by the engine that, for example, generated a confidence score that met the threshold value in 250, generated the highest confidence score, and/or was generated by the most intent engines.

In some embodiments, the representation of the user's intent and the variables can be obtained as an array with multiple slots, where the representation of the user's intent is textual data in one or more slots of the array (e.g., "thermostat.setTemperature" in array slot 0) and the variables in one or more other slots of the array (e.g., 70 in a slot associated with a value and "F" in a slot associated with units).

In some embodiments, a state may be associated with required variables and optional variables. The required variables and optional variables may be associated with an action to be performed by the state, and the action may not be able to be performed without the required variables but can be performed without the optional variables. For example, a state that performs an action associated with setting a thermostat temperature may have required variables of value and unit and an optional binary variable of heater/air conditioning.

Accordingly, in 270, the computing device can determine whether each of the required variables can be validated. For example, variables that are not included in slots in the array (i.e., have not been received) and/or variables that are incomplete or outside of a range are invalid. If, in 270, there are required variables that are not validated (270:NO), the process can proceed to 275, where the computing device transmits a request for the required invalid variables.

In some embodiments, the request for the required variables can be transmitted back to the virtual assistant API (e.g., the virtual assistant API 140 or the virtual assistant API 150). For example, the request for the required variables can be formatted as textual data in a proprietary format of the virtual assistant API, transmitted to the virtual assistant API, and the virtual assistant API can convert the request into a format that can be read by the user device (e.g., the user device 120 or the user device 130) and/or the user. For example, the virtual assistant API or the user device can generate textual data for display, generate audio using text-to-speech (TTS) algorithms, generate images, and/or generate videos for outputting to the user, etc.

In other embodiments, the request for the required variables can be transmitted back to the user device without passing through a virtual assistant API. For example, the request for the required variables can be formatted as textual data, transmitted to the user device, and the user device can output the request and/or can convert the request into a format that can be read by the user. For example, the user device can display the textual data, generate audio using TTS algorithms, generate images, and/or generate videos for outputting to the user, etc.

In some implementations, the request for the required variables can include an emotion for the request. In various embodiments, user device and/or virtual assistant API can include functionality for applying an emotion to output of the user device. For example, the emotion can be happy, sad, surprised, etc., and the applied emotion can affect, for example, the intonation of an audio output and/or the selected text for the response.

After the response is output by the user device, the user can input the required variables, which can be transmitted to the computing device. Accordingly, slots in the array can be filled with required and optional variables based on multiple inputs from a user by receiving the user input in 200, determining that not all of the required variables are validated in 270, and repeating the process until each of the required variables are obtained.

In some embodiments, when the user input received in 200 is a variable transmitted in response to a request for the variable, the computing device may not perform 210, 220, 230, 240, 250, and/or 255, and may proceed with 260 by storing and associating the received variable with the intent and array slots.

If, in 270, the required variables are validated (270:YES), the process can proceed to 280.

In some embodiments, certain intents can cause the process to proceed to performing the action in 280 and/or transitioning to the next state in 290 without obtaining each of the required variables. For example, an intent to cancel the current conversation can result in an action of clearing session and state variables and then transitioning to an initial state. As an additional example, an intent to request help can result in a transition to a state associated with customer support without requiring further variables.

In 280, the computing device can perform an action associated with the current state, the intent, and variables. In some embodiments, the computing device can perform the action by, for example, performing a backend operation (e.g., setting a long term or session variable, performing an analysis, performing a search, etc.), sending instructions to a smart device of the user to perform a function (e.g., an Internet of Things (IoT) device, such as a smart lock, a smart plug, a smart thermostat, etc.), initiating a delivery to the user, outputting textual data, audio, images, and/or video on the computing device, and the like. In other embodiments, performing the action can include requesting actions be performed by a service system (e.g., the service system 170).

In further embodiments, performing the action can include sending a response back to the user, (e.g., via the virtual assistant API). For example, the computing device can perform a backend search based on query from the user, and send a response that can include an answer to the query, formatted as textual data, to the virtual assistant API, the virtual assistant API can convert the response to a format that can be interpreted by the user device and send the response to the user device, and the user device can output audio based on the textual data using a TTS algorithm. In some implementations, the response can include an emotion.

In 290, the computing device determine a next state and transition to the next state.

In some embodiments, the current state can be associated with a list of states that can be transitioned to based on, for example, the action performed, the intent of the user, variables associated with the current state, variables associated with the current session, or variables associated with long term memory.

In further embodiments, the list of states can correspond to a specific order of states. The computing device can determine, in order, whether the conditions of the states have been meet. If the conditions of a state are met, the computing device can transfer to that state without having to determine whether the conditions for the remaining states have been met.

In some embodiments, the conditions can be associated with the number of times that a user or a user device has asked a certain question, the number of times the user or the user device has been sent a specific response, what variables are stored in session memory or long term memory, etc. For example, if the user has asked a certain question less than a threshold number of times, a particular state may be identified as the next state, while if the user has asked a certain question a threshold number of times, a different state may be identified as the next state. This can allow for the creation of a shortcut for a question that the user asks frequently (e.g., the computing device can automatically enter certain variables).

As a further example, if the user has been asked less than a threshold number of times to link their user ID to the user device, a particular state may be identified as the next state, while if the user has been asked a threshold number of times, a different state may be identified as the next state. This can prevent repeatedly requesting the user to perform an action that the user does not wish to perform.

In various embodiments, threshold values for determining whether conditions have been met can be predetermined and/or can be dynamically adjusted. For example, in some embodiments, threshold values can be adjusted by the user or can be adjusted based on collective responses from multiple users.

In some embodiments, the computing device can clear any state variables of the current state when the computing device transitions to the next state.

In some implementations, after the computing device transitions to the next state, the computing device can restart the process in 200 for the next state when a new user input is received.

In various embodiments, 280 and 290 can be same process. For example, if the user's intent is an intent to request help, no specific action other than transferring to the next state may be performed.

While the steps depicted in FIG. 2 have been described as performed in a particular order, the order described is merely an example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
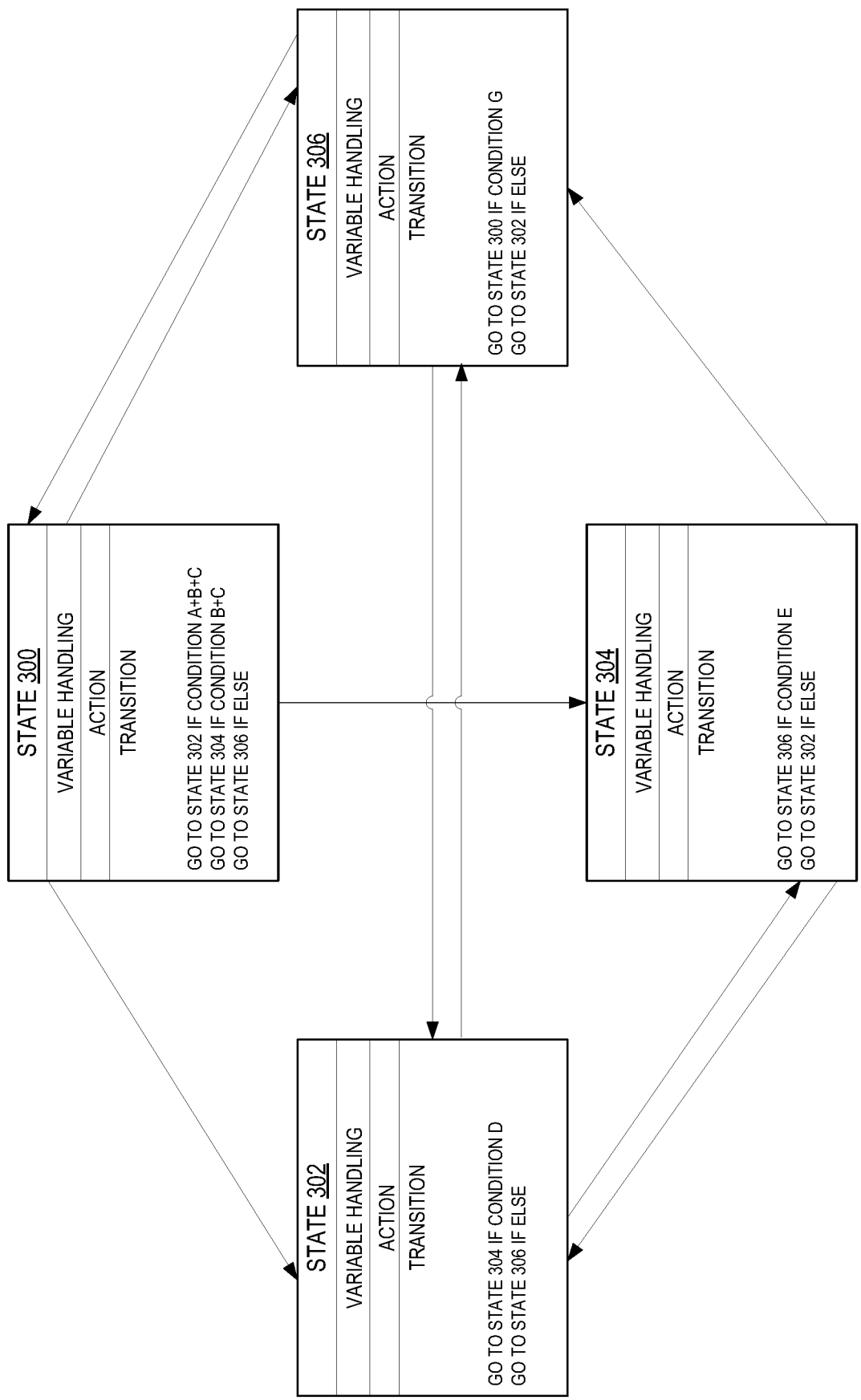
FIG. 3 is a diagram illustrating a schematic of example states that can be used in a virtual assistant system, consistent with certain disclosed embodiments.

FIG. 3 is a diagram illustrating a schematic of example states that can be used in a virtual assistant system, consistent with certain disclosed embodiments. The example virtual assistant system can include a response system (e.g., the response system 160) that, as part of an artificial intelligence architecture, maintains at least the four states shown in FIG. 3, a state 300, a state 302, a state 304, and a state 306. Each state can represent a state of a conversation with a user.

The state 300 can be, for example, an initial state. Accordingly, state 300 can represent the state of the conversation before the conversation starts. The state 300 can include a variable handling process, which can, for example, determine required and/or optional variables for the state, determine whether each of the required variables have been received from a user and validated, and initiate requests for required variables.

The state 300 can also include an action process for performing an action on the response system and/or by sending instructions to a service system (e.g., the service system 170) to perform an action, as described above.

The state 300 can additionally include a transition process for determining a next state and initiating a transition to the next state. In some embodiments, the state 300 can include an ordered list of next states, where the ordered list of next states is examined in order to determine if the conditions have been met. When the conditions for a next state have been met, the next state can become the current state.

For example, the first state in the ordered list can be the state 302, and the conditions associated with the state 302 can be A+B+C. Accordingly, if conditions A, B, and C are all true, then the next state can be the state 302. The second state in the ordered list can be the state 304, and the conditions associated with the state 304 can be B+C. Accordingly, if only conditions B+C are true, then the next state would be the state 304. If the conditions for both the first and the second state are not true, then the next state can be state 306, which is the last state in the ordered list and does not have conditions.

The state 302 can represent a state of the conversation after the conversation starts. The state 302 can include a variable handling process, which can, for example, determine required and/or optional variables for the state, determine whether each of the required variables have been received from a user and validated, and initiate requests for required variables. The state 302 can include an action process and a transition process, as described above. Additionally, when the state 302 is the current state, state 304 can be the next state if condition D is true and state 306 can be the next state if condition D is not true.

The state 304 can represent a state of the conversation after the conversation starts. The state 304 can include a variable handling process, which can, for example, determine required and/or optional variables for the state, determine whether each of the required variables have been received from a user and validated, and initiate requests for required variables. The state 304 can include an action process and a transition process, as described above. Additionally, when the state 304 is the current state, state 306 can be the next state if condition E is true and state 302 can be the next state if condition E is not true.

The state 306 can represent a state of the conversation after the conversation starts. The state 306 can include a variable handling process, which can, for example, determine required and/or optional variables for the state, determine whether each of the required variables have been received from a user and validated, and initiate requests for required variables. The state 306 can include an action process and a transition process, as described above. Additionally, when the state 306 is the current state, state 300 can be the next state if condition G is true and state 302 can be the next state if condition G is not true.

The artificial intelligence architecture described above is merely a simplified example of such a state-based architecture. In various embodiments, the artificial intelligence architecture can include additional states, including, for example, hundreds, thousands, or millions of states.

Figure 4:
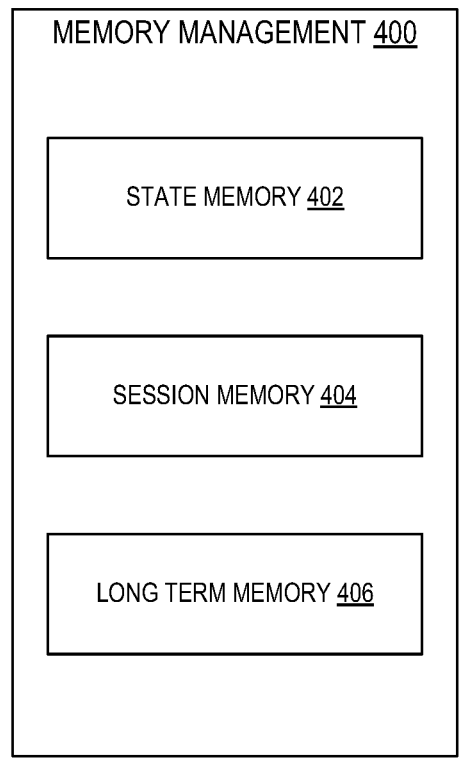
FIG. 4 is a diagram illustrating a schematic of an example memory management architecture that can be used in a virtual assistant system, consistent with certain disclosed embodiments.

FIG. 4 is a diagram illustrating a schematic of an example memory management architecture 400 that can be used in a virtual assistant system, consistent with certain disclosed embodiments. The example virtual assistant system can include a response system (e.g., the response system 160) that, as part of an artificial intelligence architecture, uses a memory management architecture that includes a state memory 402, a session memory 404, and a long term memory 406. As used herein, state memory, session memory, and long term memory refers to designations of stored information, which can be stored one or more memory devices.

The state memory 402 can store information (e.g., variables and other data) associated with current states. For example, multiple user devices can be transmitting user input to the response system, and each user device, each user, and/or each session can be associated with a current state that represents the current state of the conversation (e.g., using a user device ID, a user ID, or a session ID). The user device can provide variables associated with the current state, and the variables can be stored in the state memory 402. In various embodiments, when the response system transitions to a next state for a user device, user, and/or session, the variables stored in the state memory 402 can be cleared.

The session memory 404 can store information (e.g., variables and other data) associated with current sessions. For example, multiple user devices can be transmitting user input to the response system, and each user device and/or user can be associated with a current session that represents a current conversation. The user device can provide variables associated with the current state and/or current session, and session variables can also be set based on states that occur during the current conversation, and the variables can be stored in the session memory 404. In various embodiments, when a current session ends (e.g., times outs, transitions to a final state in the conversation, transitions to an initial state, etc.), the variables stored in the session memory 404 can be cleared.

The long term memory 406 can store information (e.g., variables and other data) associated with user devices and/or users (e.g., using user device IDs and/or user IDs). For example, multiple user devices can be transmitting user input to the response system, and each user device or user can be associated with information in the long term memory 406. The user device can provide variables (e.g., a name of the user, an address of the user, settings associated with the user device and/or user, etc.) that are intended to be stored by the response system for a long term (e.g., one month, one year, ten years, etc.) and/or indefinitely, and the variables can be stored in the long term memory 406. In some embodiments, information stored in the long term memory 406 may not be cleared, but can be changed based on new input from the user. In other embodiments, information stored in the long term memory 406 can be cleared when, for example, a user cancels a subscription, request that the information is cleared is received, no input is received from a user or user device for a predetermined amount of time (e.g., one month), a predetermined amount of time for storing the long term variable has lapsed (e.g., one year), etc.

The memory architecture described above is merely a simplified example of such an architecture. In various embodiments, the memory architecture can include additional designation of different types of memory, consistent with disclosed embodiments.

Figure 5:
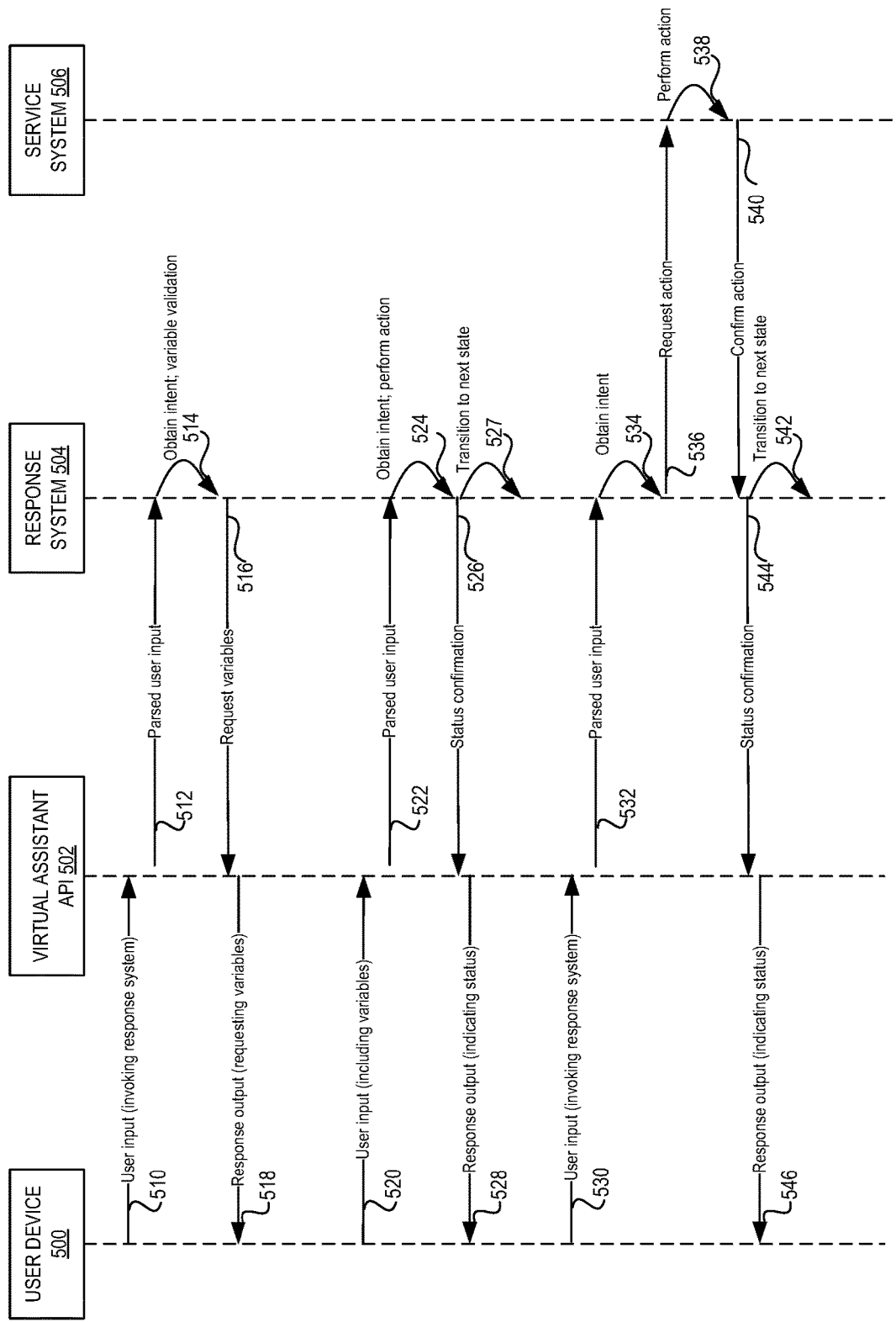
FIG. 5 is a flow diagram illustrating an example of a process for performing actions and responding to user input using state-based artificial intelligence, consistent with certain disclosed embodiments.

FIG. 5 is a flow diagram illustrating an example of a process for performing actions and responding to user input using state-based artificial intelligence, consistent with certain disclosed embodiments. In some embodiments, the process shown in FIG. 5 can be performed using a user device 500 (e.g., the user device 120 or the user device 130), a virtual assistant API 502 (the virtual assistant API 140 or the virtual assistant API 150), a response system 504 (e.g., the response system 160), and a service system 506 (e.g., the service system 170).

The process can start in 510, when the user device 500 transmit a user input to the virtual assistant API 502. In some embodiments, the user input can invoke the response system 504. For example, the user input can be a request to use an application associated with the response system 504 or the service system 506.

In some embodiments, the user device 500 can be a smart speaker that receives a voice command from a user. For example, the user could say "set the thermostat to 70," the smart speaker (i.e., the user device 500) could record the user's voice, and the smart speaker could send the recorded voice to the virtual assistant API 502.

After the user input is received at the virtual assistant API 502, the virtual assistant API 502 can parse the input by, for example, converting voice to text, performing natural language processing algorithms, performing optical character recognition, and/or performing an initial interpretation of the input. The virtual assistant API 502 can also identify that the user input is associated with the response system 504, and then, in 512, transmit the parsed user input to the response system 504.

In 514, the response system 504 can obtain an intent and any variables associated with the parsed user input by, for example, converting the parsed user input into a common format, determining a current state, determining an engine stack, and processing the converted input using one or more engines to obtain the intent and variables, as described above. Additionally, the response system 504 can determine that one or more required variables are missing, improper, or otherwise invalid (e.g., based on the current state). For example, the current state can be an initial state for using an application associated with a smart thermostat. In order to perform a setThermostat operation, the required variables may be a value and a unit. If the user input only included a value, then the required variable of a unit is invalid.

In 516, the response system 504 can transmit a request for the invalid required variables to the virtual assistant API 502, the virtual assistant API 502 can convert and/or, in 518, forward the request to the user device 500. In embodiments where the user device 500 is a smart speaker, the user device can output audio that states "please say Fahrenheit or Celsius."

In 520, the user device 500 can transmit a second user input to the virtual assistant API 502. In some embodiments, the second user input can invoke the response system 504. For example, the user could say "Fahrenheit," the smart speaker (i.e., the user device 500) could record the user's voice, and the smart speaker could send the recorded audio to the virtual assistant API 502.

After the user input is received at the virtual assistant API 502, the virtual assistant API 502 can parse the input by, for example, converting voice to text, performing natural language processing algorithms, performing optical character recognition, and/or performing an initial interpretation of the input. The virtual assistant API 502 can also identify that the user input is associated with the response system 504, and then, in 522, transmit the parsed user input to the response system 504.

In 524, the response system 504 can obtain any variables associated with the parsed user input by, for example, extracting the variables from the user input. Additionally, the response system 504 can determine that required variables have been obtained and perform an action associated with the current state. For example, the response system 504 can transmit instructions to a smart thermostat to set its temperature at 70 degrees Fahrenheit.

In 526, the response system 504 can transmit a confirmation that the action was performed and, in 527, transition to a next state (e.g., based on the current state, the action performed, state variables, session variables, long term variables, etc.).

The virtual assistant API 502 can convert and/or, in 528, forward the confirmation to the user device 500. In embodiments where the user device 500 is a smart speaker, the user device can, for example, output audio that states "temperature set."

In 530, the user device 500 can transmit a third user input to the virtual assistant API 502. In some embodiments, the third user input can invoke the response system 504 and/or the service system 506. For example, the user could say "order my pizza," the smart speaker (i.e., the user device 500) could record the user's voice, and the smart speaker could send the recorded audio to the virtual assistant API 502.

After the user input is received at the virtual assistant API 502, the virtual assistant API 502 to can parse the input by, for example, converting voice to text, performing natural language processing algorithms, performing optical character recognition, and/or performing an initial interpretation of the input. The virtual assistant API 502 can also identify that the user input is associated with the response system 504 and/or the service system 506, and then, in 532, transmit the parsed user input to the response system 504.

In 534, the response system 504 can obtain an intent and any variables associated with the parsed user input by, for example, converting the parsed user input into a common format, determining a current state, determining an engine stack, and processing the converted input using one or more engines to obtain the intent and variables, as described above. Additionally, the response system 504 can determine that required variables have been obtained and perform an action associated with the current state.

For example, the current state may have been set after the user had provided instructions for their pizza order (e.g., type, toppings, sides, billing information, delivery address, etc.), and the instructions may have already been set as session variables. In 536, the response system 504 can perform the action by transmitting a request to the service system 506 to initiate a pizza order for the user and provide the instructions for the pizza order.

In 538, the service system 506 can initiate the pizza order and, in 540, transmit a confirmation that the action was performed to the response system 504.

In 544, the response system 504 can transmit a confirmation that the action was performed to the virtual assistant API 502 and, in 542, transition to a next state (e.g., based on the current state, the action performed, state variables, session variables, long term variables, etc.).

The virtual assistant API 502 can convert and/or, in 546, forward the confirmation to the user device 500. In embodiments where the user device 500 is a smart speaker, the user device can, for example, output audio that states "order confirmed."

The process described with regard to FIG. 5 is merely a simplified example of performing actions and responding to user input using state-based artificial intelligence, and the example is not intended to be limiting.

Figure 6:
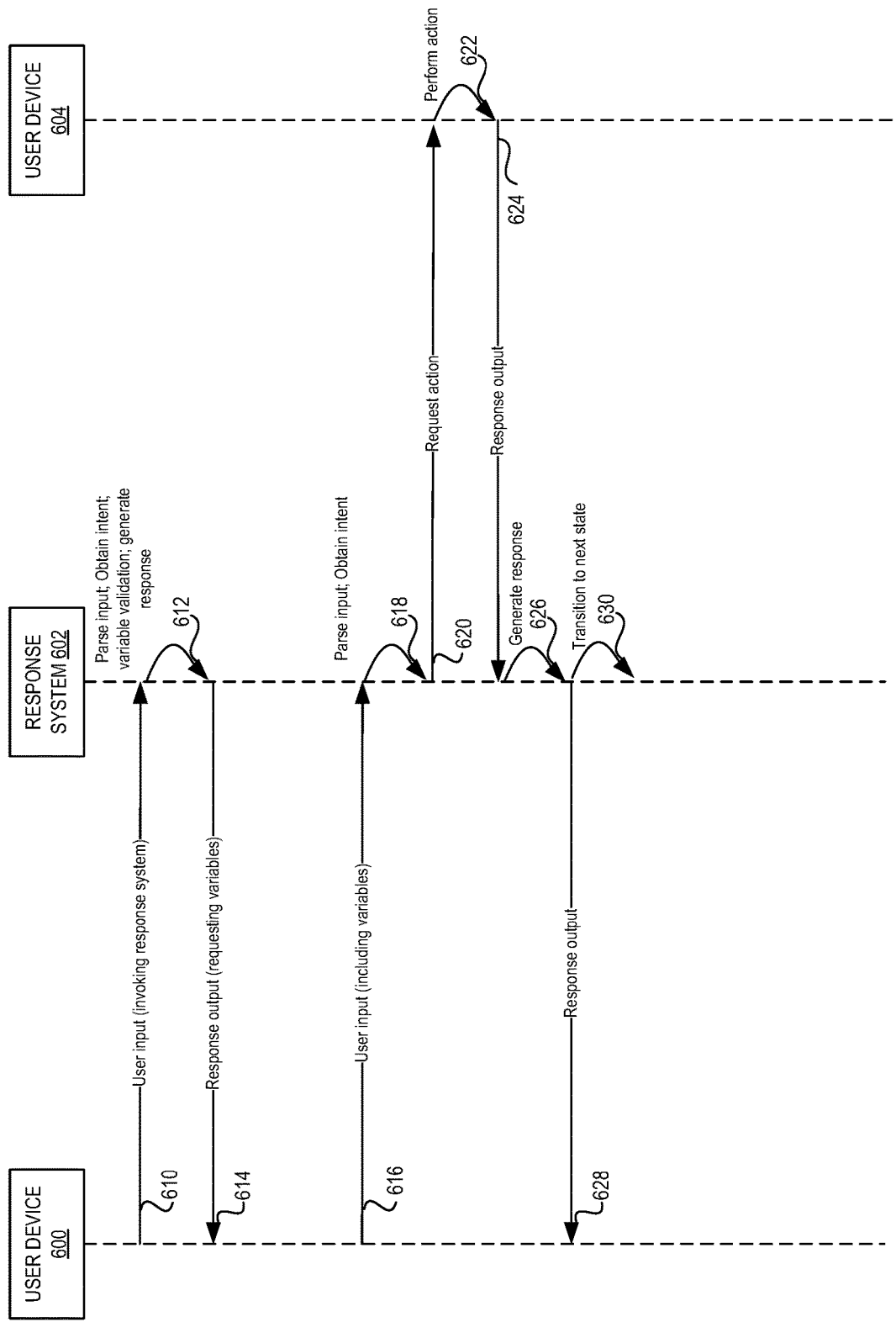
FIG. 6 is a flow diagram illustrating an example of a process for performing actions and responding to user input using state-based artificial intelligence, consistent with certain disclosed embodiments.

FIG. 6 is a flow diagram illustrating an example of a process for performing actions and responding to user input using state-based artificial intelligence, consistent with certain disclosed embodiments. In some embodiments, the process shown in FIG. 6 can be performed using a user device 600 (e.g., the user device 120 or the user device 130), a response system 602 (e.g., the response system 160), and a service system 604 (e.g., the service system 170).

The process can start in 610, when the user device 600 transmit a user input to the response system 602. In some embodiments, the user input can invoke the response system 602. For example, the user input can be a customer support request associated with the response system 602 or the service system 604.

In some embodiments, the user device 600 can be a personal computer running a browser application that receives text input from a user. For example, the user can enter a textual description of a technical problem the user is having in a chat window of a website, and the user device 600 could send the textual description to the response system 602.

In other embodiments, the user device 600 (e.g., via the browser application) can parse the user input by performing natural language processing algorithms and/or performing an initial interpretation of the input prior to sending the user input to the response system 602.

In 612, the response system 602 can obtain an intent and any variables associated with the user input by, for example, processing textual data in the user input, processing parsed user input (e.g., parsed by a browser application on the user device 600), identifying a user ID or a user device ID, converting the user input into a common format, determining a current state, determining an engine stack, and processing the converted input using one or more engines to obtain the intent and variables, etc., as described above. Additionally, the response system 602 can determine whether required variables have been validated (e.g., based on the current state). For example, the current state can be an initial state for using an automated customer support system. In order to transition to a next state, a required variable may be an identifier of the user's problem. If the user input did not include an adequate identifier of the problem, then the required variable is invalid and, in 614, the response system 602 can transmit a response output back to the user device 600 that includes a request for the variable(s). For example, the response output can be textual data that is displayed in a chat window of a browser application on the user device 600.

In 616, the user device 600 can transmit a second user input to the response system 602. In some embodiments, the second user input can invoke the response system 602. For example, the user can enter textual data based on the response output in 614.

After the user input is received at the response system 602, the response system 602 can parse the input by, for example, performing natural language processing algorithms and/or performing an initial interpretation of the input. The response system 602 can also identify that the user input is associated with a user ID or a user device ID.

In 618, the response system 602 can obtain any variables associated with the parsed user input by, for example, extracting the variables from the parsed user input. Additionally, the response system 602 can determine that required variables have been validated and perform an action associated with the current state.

In 620, the response system 602 can perform an action associated with the current state by, for example, transmitting a request to perform a search action to the service system 604 to obtain a response to the user's customer service request. In 622, the service system 604 can perform the search and, in 624, return a response output (e.g., a result of the search action in 622) to the response system 602.

In 626, the response system 602 can further perform the action associated with the current state by generating a response based on the response output received from the service system 604. In 628, the response system 602 can transmit the response output to the user device 600.

In 630, the response system 602 can transition to a next state (e.g., based on the current state, the action performed, state variables, session variables, long term variables, etc.).

The process described with regard to FIG. 6 is merely a simplified example of performing actions and responding to user input using state-based artificial intelligence, and the example is not intended to be limiting.

Figure 7:
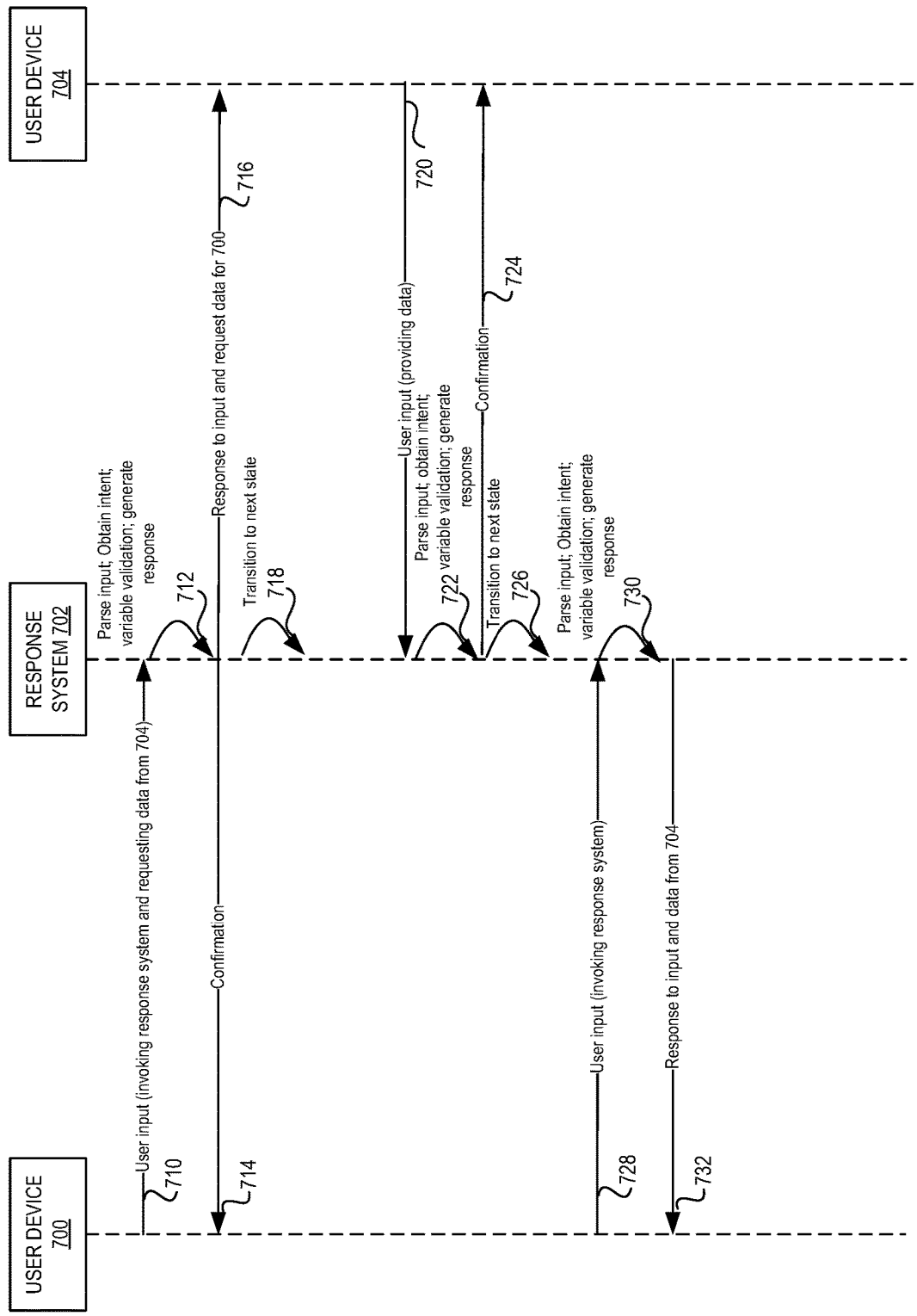
FIG. 7 is a flow diagram illustrating an example of a process for performing actions and responding to user input from multiple user devices using state-based artificial intelligence, consistent with certain disclosed embodiments.

FIG. 7 is a flow diagram illustrating an example of a process for performing actions and responding to user input from multiple user devices using state-based artificial intelligence, consistent with certain disclosed embodiments. In some embodiments, the process shown in FIG. 7 can be performed using a user device 700, a response system 702, and a user device 704.

As shown in FIG. 7, the user device 700 and the user device 710 can, in some embodiments, communicate directly with the response system 702. However, in other embodiments, the user device 700 and the user device 704 may communicate through one or more virtual assistant APIs (e.g., as shown in FIG. 5). For example, the user device 700 may transmit input to and receive responses from a first virtual assistant API that parses the input for the response system 702 and generates the responses for the user device 700, and the user device 704 may transmit input to and receive responses from a second virtual assistant API that parses the input for the response system 702 and generates the responses for the user device 704.

The process can start in 710, when the user device 700 transmit a user input to the response system 702. In some embodiments, the user input can invoke the response system 702 and include a request for data from a user at the user device 704.

In some embodiments, the user device 700 can be a smart speaker that receives a voice command from a user.

In 712, the response system 702 can obtain an intent and any variables associated with the user input by, for example, converting voice to text, performing natural language processing algorithms, performing optical character recognition, identifying a user ID or a user device ID, converting the user input into a common format, determining a current state, determining an engine stack, and processing the converted input using one or more engines to obtain the intent and variables, etc., as described above. Additionally, the response system 702 can determine whether required variables have been validated (e.g., based on the current state). For example, the response system 702 may determine that the required variables have been validated and, in 714, transmit a confirmation to the user device 700.

In 716, the response system 702 can transmit a request for the data requested by the user device 700 to the user device 704. Transmitting the request can be an action based on the current state associated with the user device 700 and/or the user device 704. Additionally, in some embodiments, the user device 704 can be a different type of device and/or use a different format compared to the user device 700. Accordingly, part of the action performed by the response system 702 can be to generate a request for the data from the user device 704 in the format of the user device 704. For example, the user device 704 can be a smartphone and the response can be formatted as a Short Message Service (SMS) message.

In other embodiments, the user device 704 can be a smart speaker. In such embodiments, the response system 702 may not be able to transmit the request to the user device 704 until an input is received from the user device 704. Accordingly, the response system 702 may queue the request and wait to transmit the request to the user device until an input is received from the user device 704. Then, the response system 702 can send a response to the input and the request for the data.

In 718, the response system 702 can transition to the next state for the user device 700 and/or the user device 704 based on sending the request to the user device 704 in 716 or based on queuing the request to send to the user device 704 when an input is received from the user device 704.

In 720, the response system 702 can receive a user input from the user device 704 that includes the requested data.

In 722, the response system 702 can obtain an intent and any variables associated with the user input by, for example, converting voice to text, performing natural language processing algorithms, performing optical character recognition, identifying a user ID or a user device ID, converting the user input into a common format, determining a current state, determining an engine stack, and processing the converted input using one or more engines to obtain the intent and variables, etc., as described above. Additionally, the response system 702 can determine whether required variables have been validated (e.g., based on the current state). For example, the response system 702 may determine that the required variables have been validated and, in 724, transmit a confirmation to the user device 704.

In some embodiments, because the user device 700 can be different from the user device 704, the engine stack used to process the input from the user device 704 can be different from the engine stack used to process the input from the user device 700. Accordingly, multiple user devices using different chatbot programs, voice assistance, etc. can communicate using the response system 702.

In embodiments where the user device 700 is a voice assistant, the response system 702 may, in 722, queue a generated response that includes the data from the user device 704 until an input is received from the user device 700.

In 726, the response system 702 can transition to the next state for the user device 700 and/or the user device 704 based on queuing the response to send to the user device 700.

In 728, the user device 700 can transmit a user input to the response system 702. In some embodiments, the user input can be related to the data requested from the user device 704 or can be a separate request.

In 730, the response system 702 can obtain an intent and any variables associated with the user input by, for example, converting voice to text, performing natural language processing algorithms, performing optical character recognition, identifying a user ID or a user device ID, converting the user input into a common format, determining a current state, determining an engine stack, and processing the converted input using one or more engines to obtain the intent and variables, etc., as described above. Additionally, the response system 702 can determine whether required variables have been validated (e.g., based on the current state) and determine that the response is queued for sending to the user device 700.

In 732, the response system 702 can transmit a response to the user device 700 that includes the data requested from the user device 704 and responds to the user input received in 728, if appropriate.

The process described with regard to FIG. 7 is merely a simplified example of performing actions and responding to user input from multiple user devices using state-based artificial intelligence, and the example is not intended to be limiting.

Figure 8:
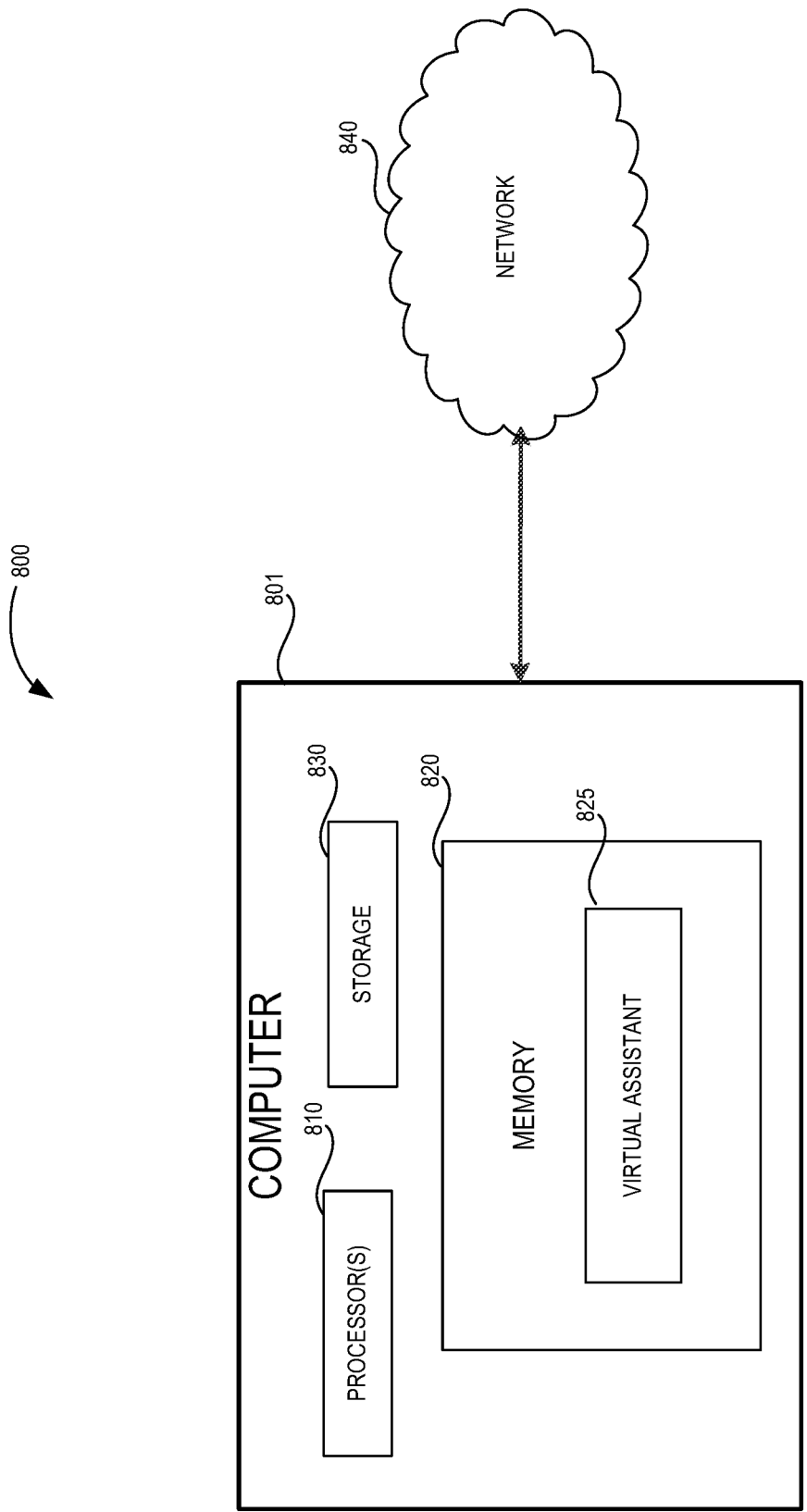
FIG. 8 is a diagram illustrating an example of a hardware system for providing an improved virtual assistant system, consistent with certain disclosed embodiments.

FIG. 8 is a diagram illustrating an example of a hardware system 800 for providing an improved virtual assistant system, consistent with certain disclosed embodiments. This example of the hardware system 800 includes specific examples of system components that may be used. The components and arrangement, however, may be varied.

A computer 801 may include a processor 810, a memory 820, a storage 830, and input/output (I/O) devices (not pictured). The computer 801 may be implemented in various ways and can be configured to perform any of the embodiments described above. In some embodiments, the computer 801 can be, for example, a desktop computer, a laptop, a tablet device, a mobile device (e.g., a smartphone), a smart device (e.g., an IoT device, a smart television, etc.), and the like. In other embodiments, the computer 801 can be a computing device such as, for example, a database server, a web server, a website server, a mainframe computer, a distributed cluster of computing nodes and/or graphics processing units (GPUs), etc. In various embodiments, the computer 801 can be a user device (e.g., the user device 120, the user device 130, the user device 500, or the user device 600, a virtual assistant API (e.g., the virtual assistant API 140, the virtual assistant API 150, or the virtual assistant API 502), a response system (e.g., the response system 160, the response system 504, or the response system 602), a service system (e.g., the service system 170, the service system 506, or the service system 604), etc. The computer 801 may be standalone or may be part of a subsystem, which may, in turn, be part of a larger system.

The processor 810 may include one or more known processing devices, such as a microprocessor from the Intel Core™ family manufactured by Intel™, the Phenom™ family manufactured by AMD™, or the like. The memory 820 may include one or more storage devices configured to store information and/or instructions used by the processor 810 to perform certain functions and operations related to the disclosed embodiments. The storage 830 may include a volatile or non-volatile, magnetic, semiconductor, tape, optical, removable, non-removable, or other type of computer-readable medium used as a storage device. In some embodiments, the storage 830 can include, for example, primary domain data, supplementary domain data, authorization information, authentication information, etc.

In an embodiment, the memory 820 may include one or more programs or subprograms including instructions that may be loaded from the storage 830 or elsewhere that, when executed by the processor 810, perform various procedures, operations, or processes consistent with disclosed embodiments. For example, the memory 820 may include virtual assistant program 825 for obtaining user input, parsing user input, converting the parsed user input into a common format, determining a current state, determining an engine stack, running the converted input through one or more engines to obtain the intent and variables, providing responses to user input, etc., according to various disclosed embodiments. The memory 820 may also include other programs that perform other functions, operations, and processes, such as programs that provide communication support, Internet access, etc. The virtual assistant program 825 may be embodied as a single program, or alternatively, may include multiple sub-programs that, when executed, operate together to perform the function of the virtual assistant program 825 according to disclosed embodiments. In some embodiments, the virtual assistant program 825 can perform all or part of the processes of FIGS. 2 and 5-6, described above.

The computer 801 may communicate over a link with a network 840. For example, the link may be a direct communication link, a local area network (LAN), a wide area network (WAN), or other suitable connection. The network 840 may include the internet, as well as other networks, which may be connected to various systems and devices.

The computer 801 may include one or more input/output (I/O) devices (not pictured) that allow data to be received and/or transmitted by the computer 801. I/O devices may also include one or more digital and/or analog communication I/O devices that allow the computer 801 to communicate with other machines and devices. I/O devices may also include input devices such as a keyboard or a mouse, and may include output devices such as a display or a printer. The computer 801 may receive data from external machines and devices and output data to external machines and devices via I/O devices. The configuration and number of input and/or output devices incorporated in I/O devices may vary as appropriate for various embodiments.

Examples of uses of the system 800 can be described by way of example with reference to the embodiments described above.

While the teachings have been described with reference to the example embodiments, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A system comprising:
a processor; and
a computer-readable medium, wherein the computer-readable medium contains instructions that, when executed by the processor, cause the processor to perform operations comprising:
receiving user input comprising an identifier;
determining a current state based on the identifier;
determining an intent engine stack based on the current state, wherein the intent engine stack comprises a plurality of intent engines each configured, when executed, to determine an intent based at least in part on the current state and the user input, and wherein determining the intent engine stack comprises ordering the intent engines in the stack based at least partially on the current state;
selecting one or more of the intent engines from the stack based at least in part on the ordering of the intent engines in the intent engine stack;
processing the user input using the selected one or more intent engines in the intent engine stack to obtain an intent and a variable;
performing an action based on the current state, the intent, and the variable; and
transitioning to a next state based on the action, the current state, the intent, and the variable.

2. The system of claim 1, wherein the user input comprises recorded audio from a smart speaker.

3. The system of claim 1, wherein the user input comprises textual data from a chat window in a browser application.

4. The system of claim 1, wherein the user input comprises parsed user input received from a virtual assistant application programming interface (API).

5. The system of claim 1, wherein the operations further comprise converting the user input into a common format.

6. The system of claim 1, wherein:
selecting the one or more intent engines comprises selecting a plurality of the intent engines in the stack;
processing the user input using the selected one or more intent engines in the intent engine stack comprises processing the user input using the selected plurality of intent engines in the intent engine stack; and
the obtained intent is determined using the intent engine of the selected intent engines that is associated with a confidence score that is greater than confidence scores for other selected intent engines in the intent engine stack.

7. The system of claim 1, wherein the operations further comprise:
   determining that a required variable associated with the current state is invalid; and
   transmitting a response to the user input comprising a request for the required variable.

8. The system of claim 1, wherein performing the action comprises transmitting instructions to a smart device to perform a function.

9. The system of claim 1, wherein performing the action comprises transmitting instructions to a service system to perform the action.

10. The system of claim 1, wherein performing the action comprises transmitting a response to a user device that transmitted the user input, wherein the user device outputs the response as at least one of text or audio.

11. The system of claim 1, wherein performing the action comprises performing the action using one or more of a state variable that is cleared based on transitioning to the next state, a session variable that is cleared at the end of a conversation associated with the current state, or a long term variable.

12. A method comprising:
   receiving user input comprising an identifier;
   determining a current state based on the identifier;
   determining an intent engine stack based on the current state, wherein the intent engine stack comprises a plurality of intent engines each configured, when executed, to determine an intent based at least in part on the current state and the user input, and wherein determining the intent engine stack comprises ordering the intent engines in the stack based at least partially on the current state;
   selecting one or more of the intent engines from the stack based at least in part on the ordering of the intent engines in the intent engine stack;
   processing, using a processor, the user input using an intent engine in the intent engine stack to obtain an intent and a variable;
   performing an action based on the current state, the intent, and the variable; and
   transitioning to a next state based on the action, the current state, the intent, and the variable.

13. The method of claim 12, wherein the user input comprises recorded audio from a smart speaker.

14. The method of claim 12, wherein the user input comprises parsed user input received from a virtual assistant application programming interface (API).

15. The method of claim 12, further comprising converting the user input into a common format.

16. The method of claim 12, wherein:
   selecting the one or more intent engines comprises selecting a plurality of the intent engines in the stack;
   processing the user input using the selected one or more intent engines in the intent engine stack comprises processing the user input using the selected plurality of intent engines in the intent engine stack; and
   the obtained intent is determined using the intent engine of the selected intent engines that is associated with a confidence score that is greater than confidence scores for other selected intent engines in the intent engine stack.

17. The method of claim 12, further comprising:
   determining that a required variable associated with the current state is invalid; and
   transmitting a response to the user input comprising a request for the required variable.

18. The method of claim 12, wherein performing the action comprises transmitting instructions to a smart device to perform a function.

19. The method of claim 12, wherein performing the action comprises performing the action using one or more of a state variable that is cleared based on transitioning to the next state, a session variable that is cleared at the end of a conversation associated with the current state, or a long term variable.

20. A non-transitory computer readable storage medium comprising instructions for causing one or more processors to:
   receive user input comprising an identifier;
   determine a current state based on the identifier;
   determine an intent engine stack based on the current state, wherein the intent engine stack comprises a plurality of intent engines each configured, when executed, to determine an intent based at least in part on the current state and the user input, and wherein determining the intent engine stack comprises ordering the intent engines in the stack based at least partially on the current state;
   select at least two of the intent engines from the stack based at least in part on the ordering of the intent engines in the intent engine stack;
   process the user input using the selected intent engines in the intent engine stack to obtain an intent and a variable, wherein, each of the selected intent engines determines an intent, and wherein the intent that is obtained is either the intent determined by the greatest number of the selected intent engines, or the intent associated with a highest confidence determined by the respective intent engines;
   perform an action based on the current state, the intent, and the variable; and
   transition to a next state based on the action, the current state, the intent, and the variable.

* * * * *